United States Patent [19]
Parette

[11] Patent Number: 5,766,495
[45] Date of Patent: Jun. 16, 1998

[54] METHODS FOR PROVIDING GENERIC AND SPECIFIC ARTWORK ON PLASTIC INFORMATION DISCS

[75] Inventor: John Joseph Parette, Jessup, Pa.

[73] Assignee: WEA Manufacturing Inc., Olyphant, Pa.

[21] Appl. No.: 816,661

[22] Filed: Mar. 13, 1997

[51] Int. Cl.$^6$ .................................................. B44C 1/22
[52] U.S. Cl. ........................... 216/54; 216/22; 216/41
[58] Field of Search ............................ 216/22, 36, 41, 216/54; 369/273

[56] References Cited

U.S. PATENT DOCUMENTS

| | | |
|---|---|---|
| 3,689,078 | 9/1972 | Ban . |
| 4,512,848 | 4/1985 | Deckman et al. ............... 216/54 X |
| 4,629,668 | 12/1986 | Hamersley et al. . |
| 4,967,286 | 10/1990 | Nomula et al. . |
| 4,972,404 | 11/1990 | Yamaguchi et al. . |
| 5,068,846 | 11/1991 | Kramer . |
| 5,138,604 | 8/1992 | Umeda et al. . |
| 5,398,231 | 3/1995 | Shin et al. . |
| 5,470,627 | 11/1995 | Lee et al. . |
| 5,676,854 | 10/1997 | Inui et al. ............... 215/54 X |

FOREIGN PATENT DOCUMENTS

| | | |
|---|---|---|
| 0 063 439 A1 | 10/1982 | European Pat. Off. . |
| 0 514 156 A2 | 11/1992 | European Pat. Off. . |
| 0 598 575 A2 | 5/1994 | European Pat. Off. . |
| 0 706 178 A2 | 4/1996 | European Pat. Off. . |
| 5054599 | 3/1993 | Japan . |
| 2203278 | 10/1988 | United Kingdom . |

OTHER PUBLICATIONS

F. Vizard, "Video's New Look," Popular Mechanics, May 1995, p. 32.

*Primary Examiner*—William Powell
*Attorney, Agent, or Firm*—Fish & Neave; Robert R. Jackson; Brian M. Dugan

[57] ABSTRACT

Generic and specific artwork is imparted to plastic discs such as CDs, CD ROMs, and DVDs (digital video discs) by exposing a layer of photoresist material on a forming member, which already contains generic artwork, to light from an original image of specific artwork. The material of the photoresist layer is exposed to different depths by different intensity light from different specific image regions. Where the image is dark, the exposure is to relatively shallow, random depths. Where the image is light, the full thickness of the photoresist layer is exposed. Development of the photoresist layer removes the exposed photoresist material. The surface features of the developed photoresist layer and any uncovered forming member surface are transferred to a second forming member used in forming a surface of the plastic disc, thereby visibly embossing both generic and specific artwork in the disc.

17 Claims, 6 Drawing Sheets

METHODS FOR PROVIDING GENERIC AND SPECIFIC ARTWORK ON PLASTIC INFORMATION DISCS

BACKGROUND OF THE INVENTION

This invention relates to plastic information discs such as digital video discs ("DVDs"), compact discs ("CDs"), compact disc read-only memories ("CD ROMs"), and the like, and more particularly to providing generic and specific visible image information (generic and specific "artwork") on such discs. For convenience herein, all such discs will be referred to universally as discs, although it will sometimes also be necessary to expressly mention certain kinds of these discs.

Labels, ornamentation, and other similar artwork are needed on discs for such purposes as identifying the information content of the disc, identifying the source (manufacturer and/or distributor) of the disc, making the disc more interesting and appealing to the eye, etc. As used herein, artwork which identifies the source of a disc (e.g., a disc's manufacturer, distributor, or recording studio) or which provides other broadly purposeful information is termed "generic artwork," while artwork which identifies a disc's content (e.g., a particular artist, compilation, or software product) or which provides other narrowly purposeful information is termed "specific artwork."

Generic and specific artwork are frequently applied by "silk screening" one of the two major surfaces of the substantially planar disc (the other major surface being the surface through which information recorded on the disc is read by machine from the disc). Silk screening or other generally similar printing techniques can produce extremely attractive results, but these techniques add extra steps to the disc manufacturing process and therefore increase the cost of the discs.

Another popular form of disc artwork is holographic artwork. Holographic artwork is produced by recording the interference pattern produced by two interfering laser beams (an object beam and a reference beam) within a disc. Holographic artwork is unique because it appears three-dimensional. Unfortunately, the process of writing holographic artwork to a disc is very time consuming (e.g., requiring a 36 hour exposure), necessarily increasing the cost of holographic artwork containing discs.

To reduce the cost of artwork-containing discs, techniques have been developed whereby visible image information may be molded directly into discs during the disc manufacturing process. One method provides "pit art" on discs (see, for example, U.S. patent application Ser. No. 08/579,302, filed Dec. 27, 1995, U.S. Pat. No. 5,729,533, which is hereby incorporated by reference herein). Such pit art may be produced using technology similar to that used to record or store information on the disc, but instead of the features being generally microscopic (and apparently random to the naked eye) for information recording, more macroscopic features are employed to produce a visible image. Pit art can provide many interesting visual effects, and because it is produced during molding of the disc, it may reduce or eliminate the need for separate printing steps. Another method provides "enhanced pit art" on discs (see, for example, U.S. patent application Ser. No. 08/714,302, filed Sep. 18, 1996, which is hereby incorporated by reference herein). Such enhanced pit art may be produced using standard lithography technology and is simpler to implement than the above mentioned pit art technique.

To produce visible images on a plastic disc using either pit art, enhanced pit art, or holography, topographical features representative of the visible image to be transferred to the disc are formed in a photoresist layer disposed on a glass substrate (also termed a "glass master"). Pit art topographical features are formed in the photoresist layer using technology similar to that used for information storage or recording, while enhanced pit art and holographic topographical features are formed in the photoresist layer using standard lithography techniques. A metal impression of the topographical features, termed a "father" forming member, is then made. A subsequent series of metal impressions are then produced from the father forming member. For example, several "mother" forming members may be produced from each father forming member, and several "stamper" forming members may be produced from each mother forming member. A stamper is the forming member actually used to form discs. In general, any forming member (other than a father forming member) which is not used as a stamper is termed an "intermediary" forming member.

Artwork is therefore transferred to plastic discs by forming the plastic discs with forming members (i.e., stampers) containing topographical features representative of the visible images to be transferred. With pit art, enhanced pit art, and holographic image technology, assuming that the sequence is glass master, then father, then mothers, and then stampers, approximately 10 to 40 million plastic discs may be fabricated from a single glass master (approximately 100,000 plastic discs per stamper with approximately 100 to 400 stampers per glass master). However, conventional pit art, enhanced pit art, and holography techniques transfer all desired artwork (i.e., both generic and specific artwork) into topographical features at the glass master stage. Unless 10 to 40 million discs are required for a specific application, such a process may be somewhat inefficient because only a fraction of the number of discs which may be produced from a single glass master are produced (the process of producing stampers from an intermediary being substantially less expensive than the process of producing stampers from a glass master). That is, the cost per plastic disc is less when as many discs as possible are produced from a single glass master rather than from multiple glass masters (as would be necessary if conventional image transfer techniques were employed and if some discs required variations in specific artwork). The cost difference is especially pronounced when generic holographic artwork is involved.

A need therefore exists for a method of producing, from a single glass master, plastic discs containing different artwork. Such a method will substantially reduce the manufacturing cost of plastic discs.

In view of the foregoing, it is an object of this invention to provide methods for transferring generic and specific artwork at different stages of a plastic disc manufacturing process.

It is a more particular object of this invention to provide methods for transferring specific artwork to a forming member which already contains generic artwork.

SUMMARY OF THE INVENTION

These and other objects of the invention are accomplished in accordance with the principles of the invention by providing a method for transferring or translating generic and specific artwork into a form in which both may be rendered in a mold member to be used in molding discs. A layer of photoresist material is disposed on a first forming member (typically a mother forming member, though a father forming member or any intermediary forming member may be used) which already contains generic artwork (e.g., pit art, enhanced pit art, or holographic artwork). The photoresist layer is then exposed to the desired specific artwork (e.g., by placing a transparency of the specific artwork over the photoresist layer and shining light on the photoresist layer through the specific artwork). The light from the artwork photo-chemically changes ("exposes") the photoresist material to different depths in different regions of the artwork. Where the artwork is relatively dark or opaque, only a relatively small amount of randomly scattered light reaches the photoresist layer and exposes that layer to random depths which are less than the full thickness of the layer. Where the artwork is relatively light or transparent, enough light reaches the photoresist layer to expose that layer all the way through to the surface of the first forming member.

After the above-described exposure, the photoresist layer is "developed" (e.g., placed in a photoresist developer solution). This removes the exposed photoresist material. The resulting patterned surface of the remaining photoresist material and some now-uncovered first forming member surface is used to produce a similar pattern in the surface of a second forming member to be used in forming discs (in particular, forming one of the two, substantially planar, major surfaces of each disc). (In this context, "similar pattern" means either the same pattern or a complementary pattern analogous to the relationship between positive and negative forms in molding processes generally.) Preferably the second forming member is used in the mold in which discs are molded so that the generic and specific artwork are molded into the disc surface as part of the disc molding process. Where the second forming member surface is randomized (corresponding to dark or opaque areas in the original specific artwork), the second forming member gives the resulting disc a light, frosted appearance due to the random scattering of light impinging on those portions of the disc. Where the second forming member surface is smoother (corresponding to light or transparent areas in the original specific artwork), the second forming member gives the resulting disc a dark, polished or mirror-like appearance due to the more regular reflection of light impinging on those portions of the disc.

In general, any technique which will transfer visible image information into topographical features on a surface may be used to transfer generic and specific artwork in accordance with this invention.

Further features of the invention, its nature and various advantages, will be more apparent from the accompanying drawings and the following detailed description of the preferred embodiments.

DETAILED DESCRIPTION OF THE PREFERRED EMBODIMENTS

For purposes of illustration, the invention will be described for the most part in the context of its application to digital video discs ("DVDs"). It will be understood, however, that the invention is equally applicable to other types of information recording discs.

Figure 1:
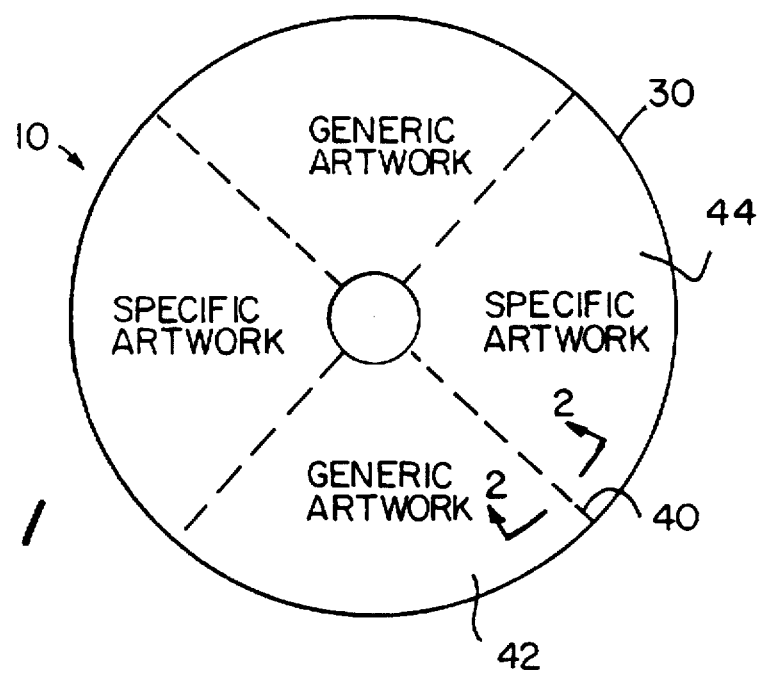
FIG. 1 is a simplified elevational view of an illustrative disc made in accordance with this invention.
Figure 2:
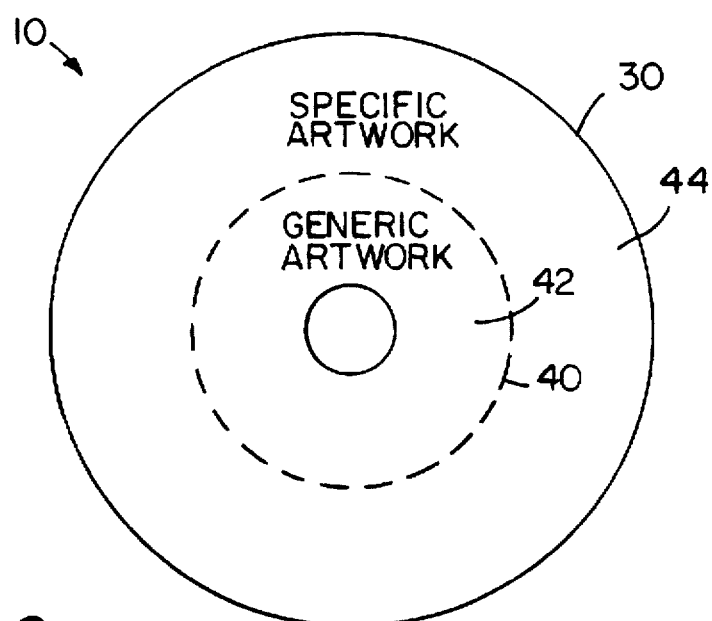
FIG. 2 is a simplified elevational view of another illustrative disc made in accordance with this invention.
Figure 3:
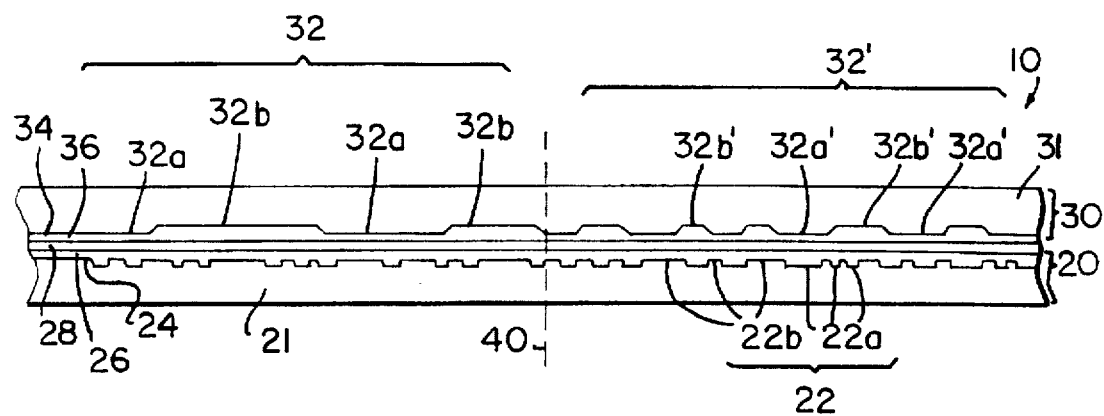
FIG. 3 is a simplified sectional view taken along the line 2—2 in FIG. 1. For greater clarity, section lines have not been employed in FIG. 3.

As shown in FIGS. 1–3 a DVD 10 is typically made of two CD-type discs 20 and 30 glued back-to-back. FIGS. 1–3 illustrate the case in which only one of these two discs is needed for information recording. The other disc can then be used entirely for artwork in accordance with this invention. If both discs are needed for information recording, then artwork in accordance with this invention can be confined to portions of either disc that are not needed for such information recording.

In the illustrative embodiment shown in FIGS. 1–3, lower disc 20 is used for information recording, while upper disc 30 is used for visible image information in accordance with this invention. Discs 20 and 30 are held together by a layer of adhesive 28 between the "backs" of the discs. Information is recorded on disc 20 in the form of a very long spiral "track", along which a succession of "pits" and "lands" are formed (e.g., molded) in the plastic surface. These pits and lands are indicated by features 22a and 22b in FIG. 3. A thin layer 24 of aluminum is applied to this surface to make the pits and lands machine-readable by light reflection through the substantially clear plastic 21 which is the major component of the disc. Then a protective layer 26 of resin such as lacquer is applied over the aluminum.

Visible image disc 30 may be constructed in a generally similar way. The visible image information is formed into a surface of the plastic as represented by features such as 32a, 32b (representing a portion of generic artwork 42 in FIG. 1) and 32a', 32b' (representing a portion of specific artwork 44 in FIG. 1). This surface is covered with a thin layer 34 of aluminum, and the aluminum is covered with a protective layer 36 of resin. The image information is visible to a user of the disc by the way light is reflected from aluminum layer 34 through substantially clear plastic 31. Note that for clarity purposes only, specific artwork features are shown to possess smaller lateral dimensions than generic artwork features.

As shown in FIGS. 1 and 2, in a preferred embodiment, generic artwork 42 and specific artwork 44 of disc 30 are spatially separated. Viewing disc 30 as lying on a two-dimensional polar axis with angular coordinate θ and radial coordinate R, demarcation line 40 separates generic artwork 42 from specific artwork 44 along a fixed angular coordinate θ in FIG. 1, while in FIG. 2, demarcation line 40 separates generic artwork 42 from specific artwork 44 along a fixed radial coordinate R. It is understood that, in general, generic artwork 42 and specific artwork 44 may in fact be positioned at any location on disc 30 and may even be positioned on top of one another.

Figure 4:
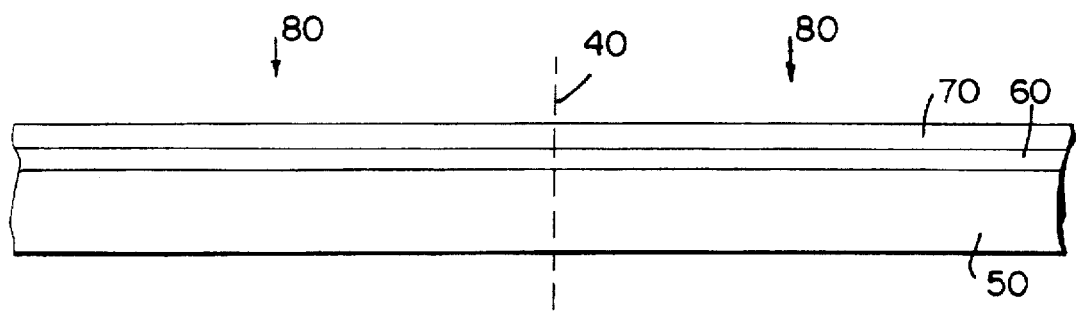
FIG. 4 is a simplified sectional view of illustrative structure used in accordance with this invention.

The start of an illustrative embodiment for capturing generic and specific visible images in disc 30 in accordance with this invention is shown in FIG. 4. Element 50 is a substrate member such as a glass plate. One surface of substrate 50 is coated with a layer 60 of photoresist material such as Shipley S1818 AZ photoresist having a 15% concentration. An illustrative thickness of layer 60 is approximately 1 micron. The substrate and photoresist layer are baked (e.g., for about 30 minutes at 80° C.) to set the photoresist material.

A transparency 70 containing a representation of the desired generic visible image is then placed over the photoresist layer. Transparency 70 may be a conventional positive film and a diffusion sheet. The diffusion sheet is a translucent film with a frosted appearance for helping to ensure that the frosted-appearing image portions described below are produced. Any other suitable image source may be used.

The next step is to shine light 80 on photoresist layer 60 through generic image-bearing member 70. For example, the source of light 80 may be a 1000 watt metal halide lamp which is operated for about 30 seconds. The light reaching layer 60 exposes the photoresist material of that layer to a depth proportional to the amount of light received in each region of the layer. Where generic image transparency 70 is relatively dark or opaque, only a relatively small amount of randomly scattered light reaches photoresist layer 60 and exposes that layer to random depths which are less than the full thickness of the layer. Where the generic image transparency 70 is relatively light or transparent, enough light reaches photoresist layer 60 to expose that layer all the way through to substrate 50. In a preferred embodiment, a portion of transparency 70 located above disc 30 wherein specific artwork 44 is to be placed (i.e., to the right of demarcation line 40 in FIG. 4) is transparent so that photoresist layer 60 is exposed all the way through to substrate 50 in this location.

The term "expose" or the like is used herein to refer to the photo-chemical change which occurs in photoresist material when it receives light. This photo-chemical change renders the exposed material soluble in photoresist developer solution.

Figure 5:
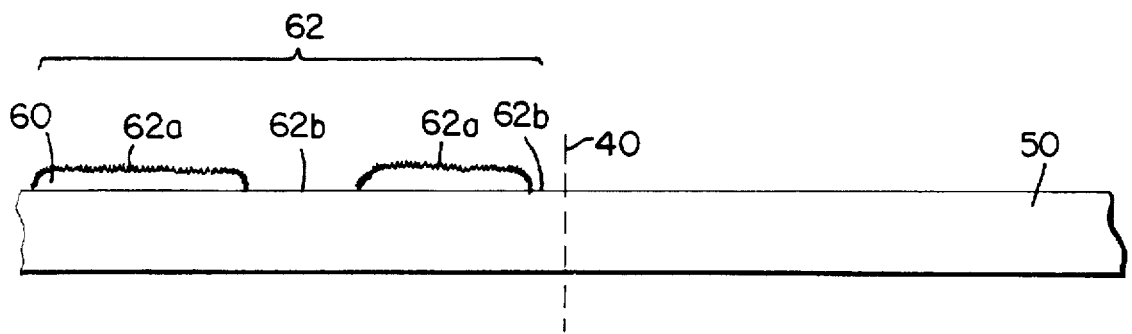
FIG. 5 shows portions of the structure of FIG. 4 at a later stage in their use in accordance with the invention.

After layer 60 has been exposed to the lighted generic image transparency as described above, light 80 is extinguished, generic image bearing member 70 is removed, and substrate 50 and layer 60 are placed in a photoresist developer solution (e.g., a 20% concentration of Shipley microposit developer solution for 25 seconds). This removes the exposed photoresist material from layer 60. FIG. 5 is a simplified depiction of how substrate 50 and what remains of layer 60 may appear after development as described above. To the left of demarcation line 40, in regions such as 62a some of photoresist layer 60 remains, albeit with a randomly roughened surface due to the relatively small amount of randomly scattered light that reached those portions of layer 60 through associated relatively dark or opaque portions of generic image transparency 70. In region 62b, on the other hand, all of the photoresist material has been removed to uncover a portion of the surface of substrate 50. Regions 62b are therefore associated with relatively light or transparent portions of generic image transparency 70 through which sufficient light passed to expose photoresist layer 60 all the way through to substrate 50. For convenience in what follows, regions 62a and 62b are sometimes referred to collectively as surface 62. To the right of demarcation line 40, all photoresist material has been similarly removed to uncover the surface of substrate 50.

Figure 6:
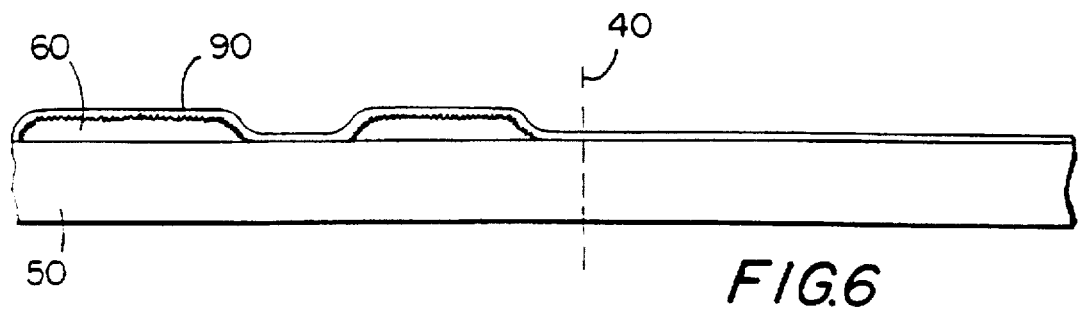
FIG. 6 shows a still later stage of use of the above-mentioned structure in accordance with the invention.
Figure 7:
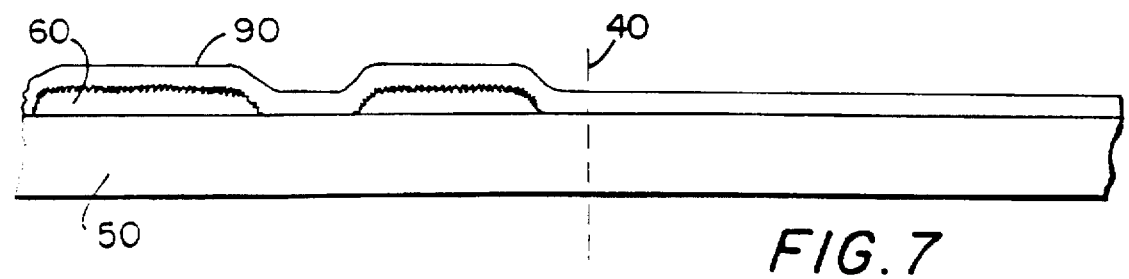
FIG. 7 shows a further development of the structure of FIG. 6 in accordance with the invention.

The next steps are performed to transfer the shape of surface 62 to a member that can be used to form disc surfaces. In a particularly preferred embodiment this is done in the same general way that is conventionally used to produce the forming member that is used to record information (pits and lands) in a disc. Elements 50 and 60, as shown in FIG. 6, are placed in an atmosphere of metal vapor such as nickel vapor. A thin layer 90 of metal deposits or condenses on surface 62 and any uncovered portion of substrate 50 as shown in FIG. 6. The structure shown in FIG. 6 is then put in a metal plating solution to plate more metal (e.g., more nickel) on surface 62 and any uncovered portion of substrate 50 as shown in FIG. 7. For simplicity the thicker metal layer shown in FIG. 7 continues to be identified by the reference number 90. Note that the lower surface of layer 90 conforms exactly to surface 62 and any uncovered portion of substrate 50. Accordingly, the lower surface of layer 90 is randomly rough in regions corresponding to surface regions 62a, but smooth in regions corresponding to surface regions 62b and in the region to the right of demarcation line 40.

Figure 8:
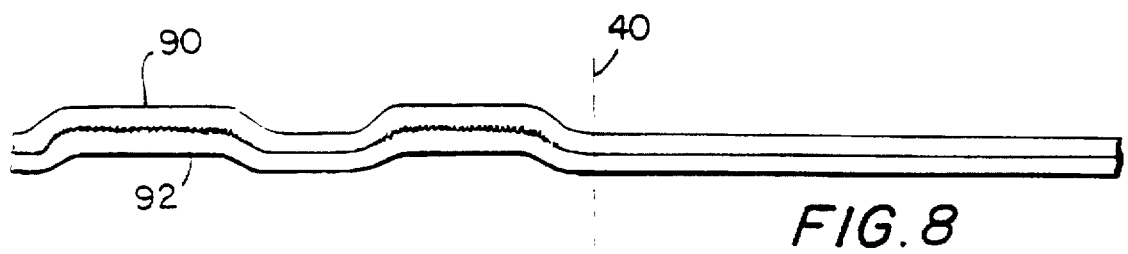
FIG. 8 shows further processing of one of the elements from FIG. 7.
Figure 9:
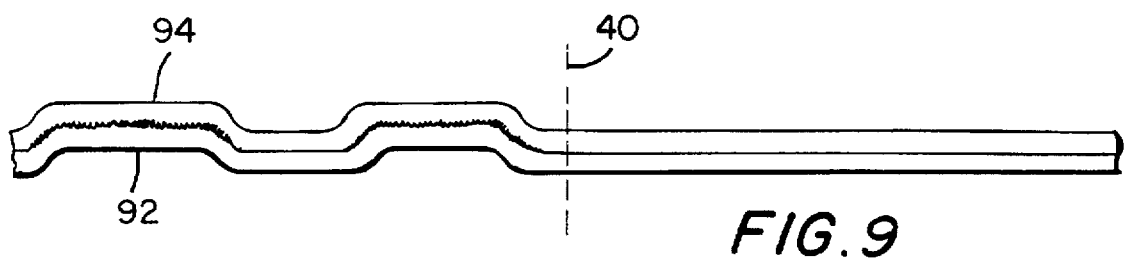
FIG. 9 shows further processing of one of the elements from FIG. 8.

Next, metal layer 90, which is now sufficiently thick and strong to retain its shape unsupported, is removed from elements 50 and 60. Metal layer 90 is used as a so-called "father" forming member to shape complementary metal intermediary forming members 92 (so-called "mother" forming members) as shown in FIG. 8. For example, several intermediary forming members 92 may be made from one father 90 by several successive repetitions of steps such as the following: (1) passivate the surface of the father, (2) plate metal on the passivated surface, and (3) separate the newly plated metal from the father to produce the intermediary mother forming member. Several stamper forming members 94 (FIG. 9) may then be produced from each mother forming member 92 by repeating, with the mother forming member, steps like those used to make the mother forming member from father 90. Each stamper forming member 94 is usable as an interior surface of a mold in which the plastic portion 31 of discs 30 (FIGS. 1–3) are molded. Accordingly, a stamper forming member 94 used in this way imparts its surface shape to the surface 32 of the plastic part of the disc. Only generic artwork may be imparted by stamper forming member 94 of FIG. 9.

Figure 10:
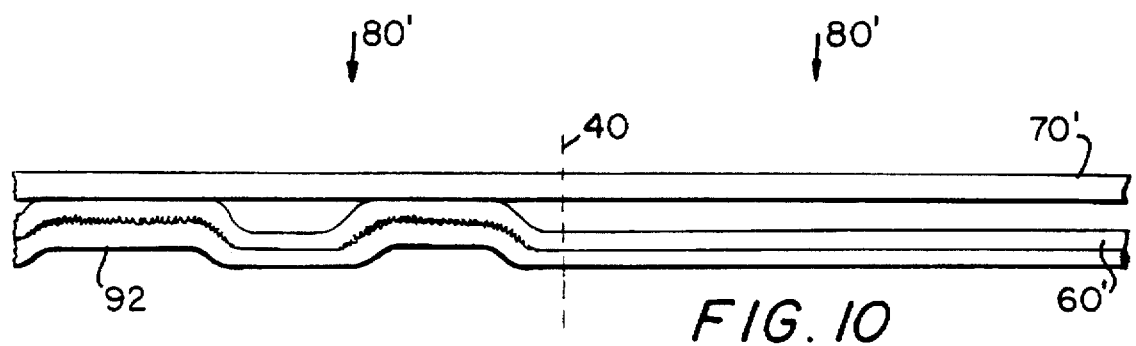
FIG. 10 is a simplified sectional view showing still further processing of one of the elements from FIG. 9 in accordance with this invention.

The start of an illustrative embodiment for capturing specific artwork 44 in disc 30 in accordance with this invention is shown in FIG. 10. As the processing steps for capturing specific artwork 44 in disc 30 are similar to the processing steps for capturing generic artwork 42 in disc 30, the discussion of them here can be somewhat abbreviated.

Element 92 is, in a preferred embodiment, a mother forming member (though any forming member may be used). (It will be understood that a forming member containing generic holographic artwork may also be used as forming member 92.) One surface of forming member 92 is coated with a photoresist layer 60'. The forming member 92 and photoresist layer 60' are then baked (e.g., for about 30 minutes at 80° C.) to set the photoresist material.

A transparency 70' containing a representation of the desired specific visible image to be transferred is then placed over photoresist layer 60'. Transparency 70' may be a conventional positive film and a diffusion sheet. Any other suitable specific image source may be used.

The next step is to shine light 80' on photoresist layer 60' through specific image-bearing member 70' (to expose photoresist layer 60'). In a preferred embodiment, a portion of transparency 70' located above the portion of disc 30 wherein generic artwork 42 is located (i.e., to the left of demarcation line 40 in FIG. 10) is transparent such that the photoresist layer 60' is exposed all the way through to forming member 92 in this region.

Figure 11:
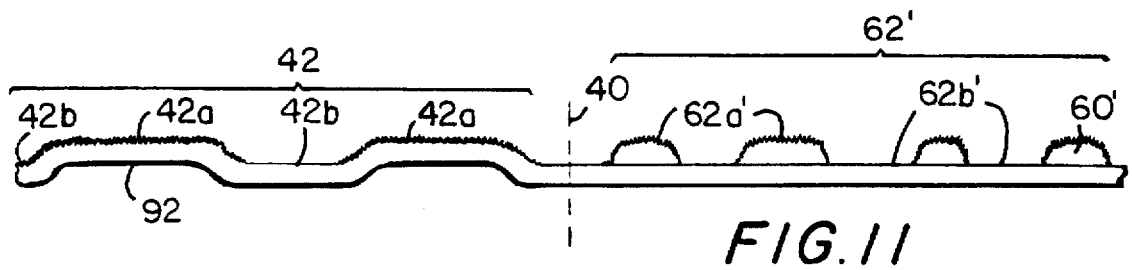
FIG. 11 shows portions of the structure of FIG. 10 at a later stage in their use in accordance with the invention.

After layer 60' has been exposed to the lighted specific image transparency as described above, light 80' is extinguished, specific image bearing member 70' is removed, and forming member 92 and layer 60' are placed in a photoresist developer solution (e.g., a 20% concentration of Shipley microposit developer solution for 25 seconds). This removes the exposed photoresist material from layer 60'. FIG. 11 is a simplified depiction of how forming member 92 and hat remains of layer 60' may appear after development as described above. In regions such as 62a' some of photoresist layer 60' remains, albeit with a randomly roughened surface due to the relatively small amount of randomly scattered light that reached those portions of layer 60' through associated relatively dark or opaque portions of specific image transparency 70'. In region 62b', on the other hand, all of the photoresist material has been removed to uncover a portion of the surface of forming member 92. Regions 62b' are therefore associated with relatively light or transparent portions of specific image transparency 70' through which sufficient light passed to expose photoresist layer 60' all the way through to forming member 92. For convenience in what follows, regions 62a' and 62b' are sometimes referred to collectively as surface 62'. To the left of demarcation line 40, all photoresist material has been removed to uncover the surface of forming member 92 which already contains generic artwork 42.

Figure 12:
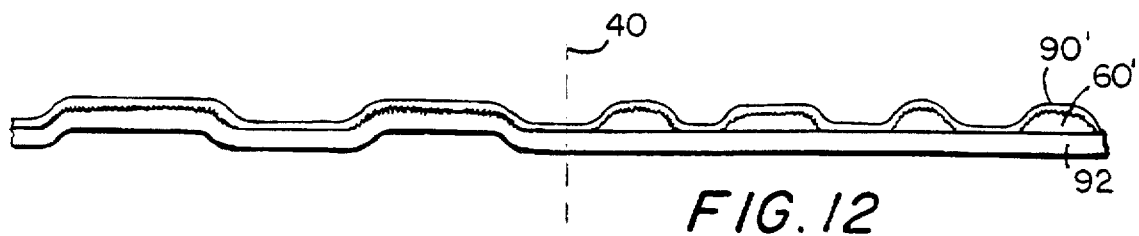
FIG. 12 shows a still later stage of use of the above-mentioned structure in accordance with the invention.
Figure 13:
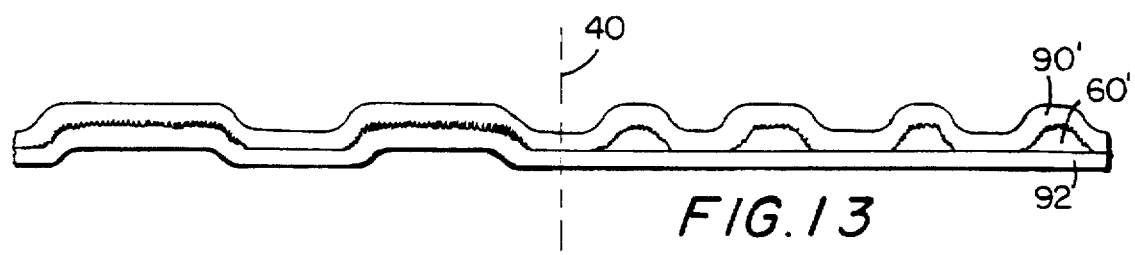
FIG. 13 shows a further development of the structure of FIG. 12 in accordance with the invention.

The next steps are performed to transfer the shape of surface 42 and surface 62' to a member that can be used to form disc surfaces. Elements 92 and 60', as shown in FIG. 12, are placed in an atmosphere of metal vapor such as nickel vapor. A thin layer 90' of metal deposits or condenses on surface 42 and surface 62' as shown in FIG. 12. The structure shown in FIG. 12 is then put in a metal plating solution to plate more metal (e.g., more nickel) on surface 42 and surface 62' as shown in FIG. 13. For simplicity the thicker metal layer shown in FIG. 13 continues to be identified by the reference number 90'. Note that the lower surface of layer 90' conforms exactly to surface 42 and surface 62'. Accordingly, the lower surface of layer 90' is randomly rough in regions corresponding to surface regions 42a, 62a' but smooth in regions corresponding to surface regions 42b, 62b'.

Figure 14:
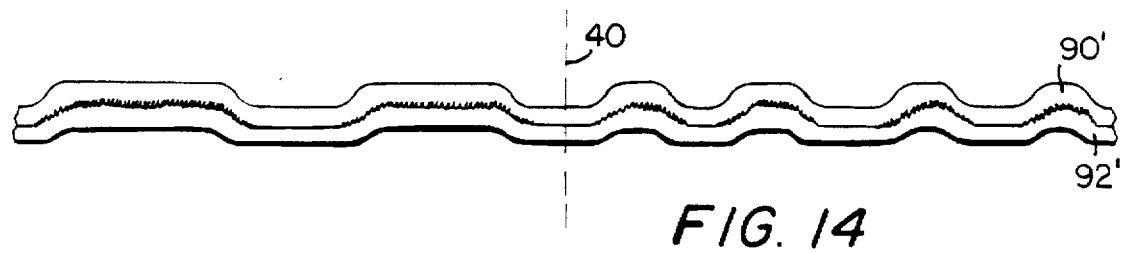
FIG. 14 shows further processing of one of the elements from FIG. 13.
Figure 15:
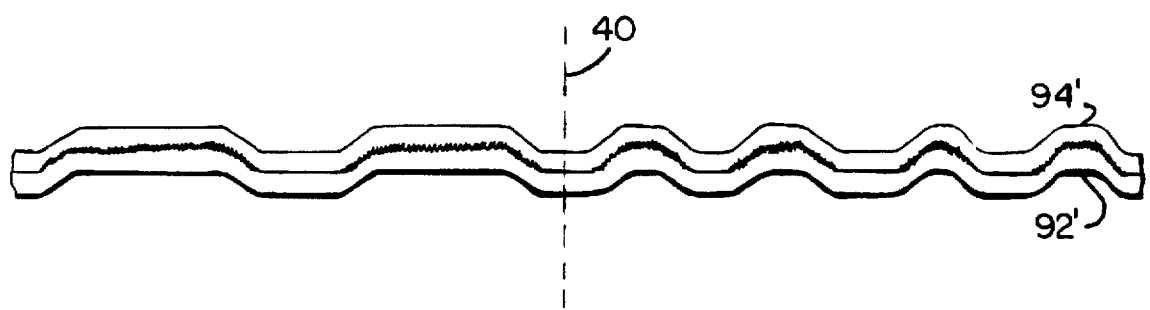
FIG. 15 shows further processing of one of the elements from FIG. 14.

Next, metal layer 90', which is now sufficiently thick and strong to retain its shape unsupported, is removed from elements 92 and 60'. Metal layer 90' is used as a new "father" to shape complementary metal intermediary forming members 92' (new "mother" forming members) as shown in FIG. 14. For example, several new mothers 92' may be made from one new father 90' as previously described with regard to father 90. Several stamper forming members 94' (FIG. 15) may then be produced from each new mother 92'. Each stamper forming member 94' is usable as an interior surface of a mold in which the plastic portion 31 of discs 30 (FIGS. 1–3) are molded. Accordingly, a stamper forming member 94' used in this way imparts its surface shape to the surface 32 and the surface 32' of the plastic part of the disc. Both generic and specific artwork may be imparted by stamper forming member 94' of FIG. 15. (It will be understood that metal layer 90' may be used directly as a stamper if so desired. Further, as used herein "using a forming member" encompasses not only the direct use of the forming member but also the use of any intermediary/stamper produced from the forming member.)

To complete disc 30, a layer 34 of a light-reflective metal such as aluminum is deposited on patterned plastic surface 32 and surface 32', and then a protective layer 36 of resin such as lacquer is deposited over the metal layer.

The generic artwork embossed in surface 32 and specific artwork embossed in surface 32' are rendered highly visible by light reflected through substantially clear plastic 31 by similarly patterned metal layer 34 on surface 32 and surface 32'. For example, surface regions 32a, 32a' may correspond to surface regions 62a, 62a ' in FIG. 5, FIG. 11. In that case regions 32a, 32a ' are randomly rough (like regions 62a, 62a ') and scatter light that falls on them. Regions 32a, 32a ' therefore appear light or frosted and produce light areas in the disc artwork. Regions 32b, 32b ', on the other hand, may correspond to surface regions 62b, 62b ' in FIG. 5, FIG. 11. Regions 32b, 32b ' therefore have the surface features of substrate 50 and forming member 92 (assumed in this embodiment to be smooth), respectively. Accordingly, regions 32b, 32b ' have more uniform light reflectivity and thus appear mirror-like and dark, thereby producing dark areas in the disc artwork. Indeed, continuing with the assumption that substrate 50 and forming member 92 are smooth, regions 32b, 32b ' tend to have a polished appearance, which contrasts strongly with the frosted appearance of regions 32a, 32a'.

It will be understood that the foregoing is only illustrative of the principles of this invention, and that various modifications can be made by those skilled in the art without departing from the scope and spirit of the invention. For example, the use of diffusion sheets, half-tone artwork, and substrate/forming member roughening, texturing, or patterning, similar to that described in incorporated-by-reference application Ser. No. 08/714,302, filed Sep. 18, 1996, may be used to enhance the appearance of generic and specific artwork or as methods of contrasting the two artwork forms. Additionally, holographic artwork or pit art may be added at either the generic or specific artwork transfer stage and techniques such as thermal branding and laser scribing may be used at either stage to achieve various effects. In general, any technique which will transfer visible image information into topographical features on a surface may be used to transfer specific or generic artwork in accordance with this invention.

As another example of modifications within the scope of the invention, it may be possible to project the generic or specific images onto photoresist layer 60 or 60'. Rather than being used as a mold member, forming member 94' may be used to stamp the embossed image into the plastic of the disc. The various dimensions and materials mentioned herein are preferred, but other dimensions and materials can be used if desired.

The invention claimed is:

1. A method of forming specific artwork on a major surface of a substantially planar plastic disc comprising the steps of:

transferring a depiction of said specific artwork into topographical features on a first forming member, said first forming member already containing generic artwork;

forming an impression of said topographical features and any uncovered first forming member surface in a second forming member; and using said second forming member to make an impression in said major surface of said disc.

2. The method defined in claim 1 wherein said transferring step comprises the steps of:

providing a layer of photoresist material on said first forming member;

providing a representation of said specific artwork on a medium in which said specific artwork is represented by different degrees of opacity of different portions of said medium;

shining light through said medium onto said layer in order to expose said layer to different depths in different regions indicative of the opacity of the portion of the medium associated with each region; and removing exposed photoresist material from said layer.

3. The method defined in claim 2 wherein in said shining step said layer is exposed all the way through to said first forming member surface in some but not all of said regions of said layer, so that in said forming step the impression formed includes an impression of said first forming member surface where said layer was exposed all the way through to said first forming member surface.

4. The method defined in claim 1 wherein said first forming member surface is substantially smooth.

5. The method defined in claim 1 wherein said first forming member surface is roughened.

6. The method defined in claim 2 wherein said medium is a transparency, and wherein prior to said shining step said transparency is placed on said layer.

7. The method defined in claim 2 wherein said removing step comprises the step of:

placing said layer in photoresist developer solution.

8. The method defined in claim 1 wherein said forming step comprises the steps of:

coating what remains of said topographical features and any uncovered first forming member surface with metal; and separating said metal from said topographical features and any uncovered first forming member surface.

9. The method defined in claim 8 wherein said coating step comprises the steps of:

exposing said topographical features and any uncovered first forming member surface to a vapor of said metal so that metal condenses on said topographical features and any uncovered first forming member surface; and plating additional metal on the metal that has condensed on said topographical features and any uncovered first forming member surface.

10. The method defined in claim 8 wherein said forming step further comprises the step of:

using the metal separated from said topographical features and any uncovered first forming member surface as a master for making a third forming member.

11. The method defined in claim 10 wherein said step of using the metal comprises the steps of:

removably depositing additional metal on said master;

separating said additional metal from said master to produce an intermediary;

removably depositing further metal on said intermediary; and separating said further metal from said intermediary to produce said third forming member.

12. The method defined in claim 1 wherein said using step comprises the step of:

employing said second forming member as a surface of a mold in which said disc is molded.

13. A plastic disc made by the method of claim 1.

14. The method defined in claim 1 wherein said first forming member is a father forming member.

15. The method defined in claim 1 wherein said first forming member is a mother forming member.

16. The method defined in claim 1 wherein said first forming member is any intermediary forming member.

17. The method defined in claim 1 wherein said first forming member comprises generic holographic artwork.

* * * * *